United States Patent
Kobayashi

(10) Patent No.: US 11,226,490 B2
(45) Date of Patent: Jan. 18, 2022

(54) VIRTUAL IMAGE DISPLAY DEVICE

(71) Applicant: JVCKENWOOD Corporation, Yokohama (JP)

(72) Inventor: Tatsuru Kobayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/953,394

(22) Filed: Nov. 20, 2020

(65) Prior Publication Data

US 2021/0072552 A1 Mar. 11, 2021

Related U.S. Application Data

(63) Continuation of application No. PCT/JP2019/014431, filed on Apr. 1, 2019.

(30) Foreign Application Priority Data

Jul. 23, 2018 (JP) .............................. JP2018-137416

(51) Int. Cl.
*G09G 5/00* (2006.01)
*G02B 27/01* (2006.01)
*B60K 35/00* (2006.01)

(52) U.S. Cl.
CPC ..... *G02B 27/0179* (2013.01); *G02B 27/0101* (2013.01); *B60K 35/00* (2013.01); *B60K 2370/1529* (2019.05); *B60K 2370/73* (2019.05); *G02B 2027/0187* (2013.01)

(58) Field of Classification Search
CPC ............ G02B 27/0179; G02B 27/0101; B60K 2370/1529; B60K 2370/72

USPC ............................................................ 345/7
See application file for complete search history.

(56) References Cited

U.S. PATENT DOCUMENTS

| 5,646,639 | A | 7/1997 | Koie |
| 9,551,875 | B2 | 1/2017 | Ogasawara |
| 2016/0209663 | A1* | 7/2016 | Hirokawa .......... G06K 9/00604 |
| 2017/0131550 | A1* | 5/2017 | Oh .......................... G06T 11/60 |

(Continued)

FOREIGN PATENT DOCUMENTS

| JP | H07-329603 A | 12/1995 |
| JP | 2004118088 A | 4/2004 |

(Continued)

OTHER PUBLICATIONS

International Search Report from International Application No. PCT/JP2019/014431 dated Jun. 4, 2019, 4 pages.

(Continued)

*Primary Examiner* — Jonathan M Blancha
(74) *Attorney, Agent, or Firm* — Brundidge & Stanger, P.C.

(57) ABSTRACT

A virtual image display device presents a virtual image to a user via a virtual image presentation plate. The virtual image display device includes a display unit that generates an image display light; a concave mirror that reflects the image display light and projects the image display light toward the virtual image presentation plate; and a driving mechanism that changes an orientation of the concave mirror to change an incidence angle of the image display light on the concave mirror and change a distance a from the concave mirror to the display unit in accordance with the orientation of the concave mirror.

9 Claims, 7 Drawing Sheets

(56) References Cited

U.S. PATENT DOCUMENTS

| | | | |
|---|---|---|---|
| 2018/0239152 A1* | 8/2018 | Kuo | G02B 27/0149 |
| 2018/0259771 A1* | 9/2018 | Kuzuhara | G02B 27/0101 |
| 2019/0129172 A1* | 5/2019 | Misawa | G02B 27/0101 |

FOREIGN PATENT DOCUMENTS

| | | |
|---|---|---|
| JP | 2009122582 A | 6/2009 |
| JP | 2011133633 A | 7/2011 |
| JP | 2014194492 A | 10/2014 |
| JP | 2015060180 A | 3/2015 |
| JP | 3202689 U | 2/2016 |
| JP | 2019056840 A | 4/2019 |
| JP | 2019077394 A | 5/2019 |
| WO | 2017130763 A1 | 8/2017 |
| WO | 2018008313 A1 | 1/2018 |
| WO | 2018043513 A1 | 3/2018 |

OTHER PUBLICATIONS

International Preliminary Examination Report on Patentability (II) with Written Opinion of ISA dated Jun. 15, 2020, 10 pages, relevant page (3).
Extended European Search Report from EP Application No. 19840380.0 dated Aug. 19, 2021, 7 pages.

* cited by examiner

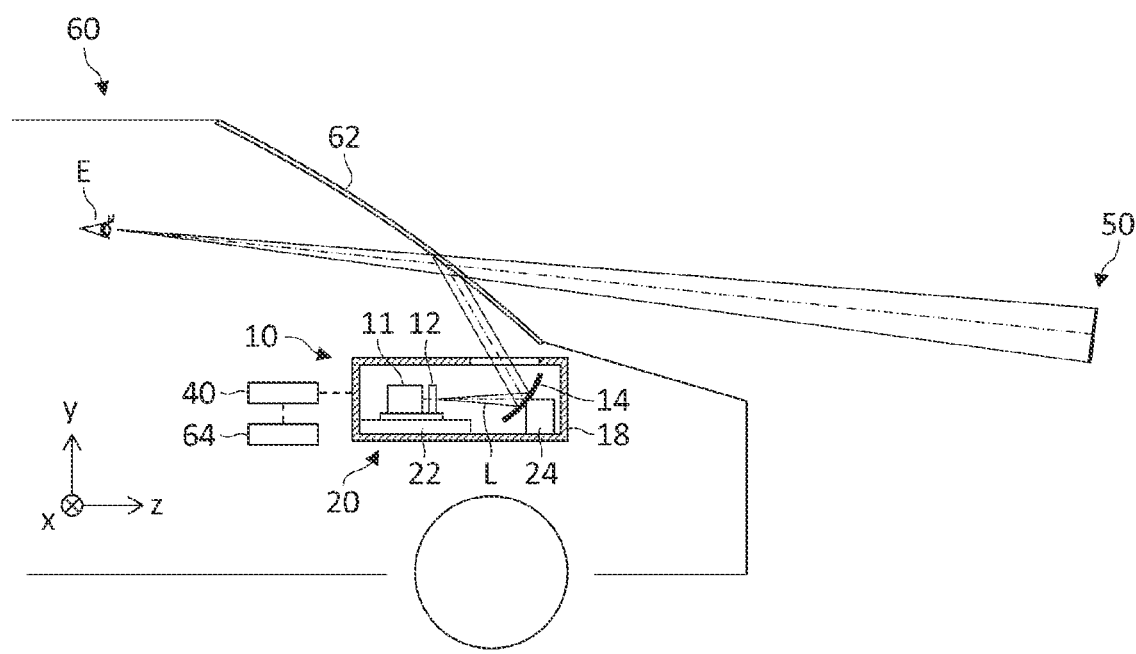

VIRTUAL IMAGE DISPLAY DEVICE

CROSS REFERENCE TO RELATED APPLICATION

Priority is claimed to Japanese Patent Application No. 2018-137416, filed on Jul. 23, 2018 and PCT International Patent Application No. PCT/JP2019/014431, filed on Apr. 1, 2019, the entire contents of which are incorporated herein by reference.

BACKGROUND

1. Field of the Invention

The present invention relates to a virtual image display device.

2. Description of the Related Art

Recently, head-up displays are available for use as display devices for vehicles. A head-up display projects an image display light toward, for example, a windshield of a vehicle and displays a virtual image based on the image display light, superimposing the virtual image on the scenery outside the vehicle. Since the height of the eyes of the user (e.g., the driver) differs from one individual to another, the height at which the virtual image can be viewed is adjusted by adjusting the orientation of the concave mirror that projects the image display light toward the windshield. Further, a technology of inhibiting the movement of the virtual image in the vertical direction by moving the housing that includes a display device and a concave mirror in accordance with the orientation of the concave mirror. (e.g., patent literature 1.)
[Patent Literature 1] JP2015-060180

SUMMARY

According to the aforementioned technology, the image display light is diagonally incident on the concave mirror so that the focal distance of the concave mirror changes in response to the change in the angle of the concave mirror. As a result, the position at which the virtual image is presented in the depth direction as viewed from the user will be changed in response to the change in the focal distance. It is preferred to reduce the change in the distance at which the virtual image is presented in the depth direction when the orientation of the concave mirror is changed to suit the height of the user's viewpoint.

The invention addresses the above-described issue, and a general purpose thereof is to provide a technology of reducing the change in the distance at which the virtual image is presented associated with the adjustment of the height at which the virtual image can be viewed.

The virtual image display device according to an embodiment of the present invention presents a virtual image to a user via a virtual image presentation plate. The virtual image display device includes: a display unit that generates an image display light; a concave mirror that reflects the image display light and projects the image display light toward the virtual image presentation plate; and a driving mechanism that changes an orientation of the concave mirror to change an incidence angle of the image display light on the concave mirror and moves the display unit to change a distance from the concave mirror to the display unit in accordance with the orientation of the concave mirror.

Optional combinations of the aforementioned constituting elements, and mutual substitution of constituting elements and implementations between methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 1 schematically shows the configuration of the virtual image display device according to the embodiment;

DETAILED DESCRIPTION

Figure 2A:
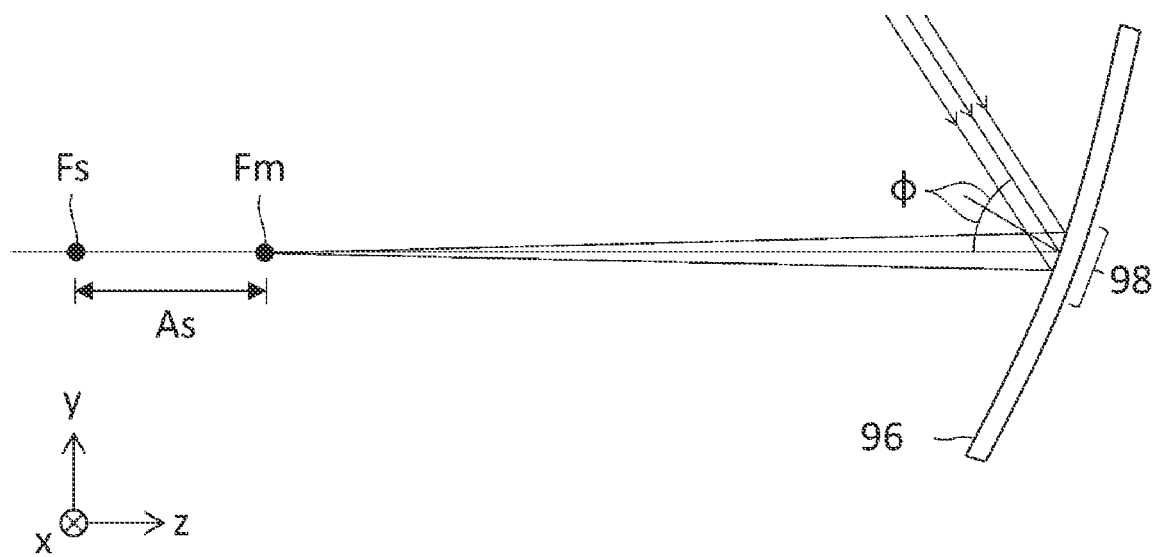
FIGS. 2A and 2B schematically show the focal position of parallel light beams incident on a concave mirror.

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration.

FIG. 1 schematically shows the configuration of a virtual image display device 10 according to the embodiment. In this embodiment, the virtual image display device 10 is installed in a dashboard of a vehicle 60, which exemplifies a moving object. The virtual image display device 10 is a so-called head-up display device. The virtual image display device 10 presents a virtual image 50 in front of the vehicle 60 in the direction of travel (rightward direction in FIG. 1) by projecting an image display light L toward a windshield 62, which is a virtual image presentation plate. The user E (e.g., the driver) can see the virtual image 50 superimposed on the actual scenery via the windshield 62. Therefore, the user E can access information shown in the virtual image 50 substantially without moving the line of sight while driving the vehicle. Referring to the FIG. 1, the direction of travel of the vehicle 60 (longitudinal direction) is defined as the z direction, the vertical direction of the vehicle 60 (up/down direction) is defined as the y direction, and the transversal direction of the vehicle 60 is defined as the x direction.

The virtual image display device 10 includes an illumination unit 11, a display unit 12, a housing 18, a driving mechanism 20, and a control unit 40. The housing 18 houses the illumination unit 11, the display unit 12, the concave mirror 14, and the driving mechanism 20 inside. The housing 18 is fixed to the vehicle 60 and is mounted to the vehicle 60 so as not to change the position relative to the windshield 62.

The illumination unit 11 is a light source for generating a display light and generates an illumination light for illuminating the display unit 12. The illumination unit 11 includes a light emitting device such as a light emitting diode (LED) and a laser diode (LD), and an optical device for adjusting the light intensity distribution and angle distribution of the light output from the light emitting device. The illumination unit 11 provides the display unit 12 with a substantially uniform white light. The configuration of the illumination unit 11 is not limited to any particular type. For example, a light emitting device such as a light tunnel, a Fresnel lens, and a light diffusion plate may be used to condition the output light from the light emitting device.

The display unit 12 modulates an illumination light from the illumination unit 11 to generate a display light and forms an intermediate image (real image) corresponding to the display content of the virtual image 50. The display unit 12 includes an image display device of transmission type for generating a display light. For example, the display unit 12 includes a display device such as a liquid crystal panel of transmission type. The image display device receives an image signal transmitted from the control unit 40 and generates an image display light L for the display content corresponding to the image signal. The display unit 12 may further include an optical device for conditioning the orientation and light distribution angle of the image display light L. Further, the display unit 12 may be configured by combining an element other than a liquid crystal panel of transmission type and a screen of transmission type such as a microlens array sheet and a light diffusion sheet. The element is exemplified by a projection unit such as a digital micromirror device (DMD), a liquid crystal on silicon (LOCS) laser scanning module (LSM), and a micro electro mechanical systems (MEMS) LSM.

The concave mirror 14 projects the image display light L generated by the display unit 12 toward the windshield 62. The concave mirror 14 enlarges an image based on the image display light L and presents the enlarged image to the user E. The user E perceives the image based on the image display light L as the virtual image 50.

The driving mechanism 20 includes a first driving mechanism 22 and a second driving mechanism 24. The first driving mechanism 22 moves the illumination unit 11 and the display unit 12 linearly in the direction of projection of the image display light L and changes the distance from the display unit 12 to the concave mirror 14. The first driving mechanism 22 includes, for example, a drive motor and a lead screw for transforming the rotary motion of the motor into linear motion. The first driving mechanism 22 may be comprised of a so-called linear stage mechanism.

The first driving mechanism 22 adjusts the position of presentation of the virtual image 50 in the depth direction as viewed from the user E by changing the position of the display unit 12. Since the virtual image display device 10 is an optical system for presenting a virtual image, the display unit 12 is provided closer to the concave mirror 14 than the focal position of the concave mirror 14. Therefore, the position of presentation of the virtual image 50 as viewed from the user E will be relatively closer when the display unit 12 is moved relatively closer to the concave mirror 14. Conversely, the position of presentation of the virtual image 50 as viewed from the user E will be relatively farther when the display unit 12 is moved farther from the concave mirror 14. If the display unit 12 is provided at the focal position of the concave mirror 14, the position of presentation of the virtual image 50 as viewed from the user E will be infinity.

The second driving mechanism 24 rotates the concave mirror 14 to change the orientation of the concave mirror 14, thereby adjusting the orientation of the image display light L traveling toward the user E. The second driving mechanism 24 includes, for example, a drive motor and a drive gear for transmitting the rotary motion of the motor to the concave mirror 14. The second driving mechanism 24 may be comprised of a so-called rotary mechanism.

The second driving mechanism 24 changes the incidence and reflecting angle of the image display light L incident on the concave mirror 14 by changing the orientation of the concave mirror 14. Changing the incidence and reflecting angle of the image display light L on the concave mirror 14 changes the orientation of the image display light L traveling from the windshield 62 toward the user E and makes it possible to project the image display light L toward different heights. This makes it possible to present the virtual image 50 suitably to users with different heights of the eyes.

When the driving mechanism 20 changes the orientation of the concave mirror 14, the driving mechanism 20 moves the display unit 12 to change the distance from the concave mirror 14 to the display unit 12 in accordance with the orientation of the concave mirror 14. In this process, the driving mechanism 20 moves the display unit 12 to mitigate an impact that results when the focal position of the concave mirror 14 changes due to the change in the incidence and reflecting angle of the image display light L on the concave mirror 14 and that changes the distance to the position of presentation of the virtual image 50 in the depth direction due to the change in the focal position. This is designed to reduce the change in the position at which the virtual image 50 is presented in the depth direction when the "eye point", which is the height of the eyes of the user E at which the virtual image can be viewed, is adjusted in the vertical direction.

The control unit 40 generates an image for display and causes the illumination unit 11 and the display unit 12 to operate to present the virtual image 50 corresponding to the image for display. The control unit 40 is connected to an external device 64 and generates the image for display based on the information from the external device 64. The control unit 40 controls the operation of the driving mechanism 20. For example, the control unit 40 drives the driving mechanism 20 based on a user input operation via the external device 64 and adjusts the position of the eye point in the vertical direction at which the virtual image 50 can be viewed.

The external device 64 is a device for generating original data for an image displayed as the virtual image 50. For example, the external device 64 may be an Electronic Control Unit (ECU) for the vehicle 60, a navigation device, or a mobile device such as a cell phone, smartphone, and tablet. The external device 64 transmits, to the control unit 40, image data necessary to display the virtual image 50, information indicating the content and type of the image data, and information related to the vehicle 60 such as the speed and current position of the vehicle 60.

A description will be given, with reference to a comparative example, of a phenomenon in which position of presentation of the virtual image is changed in response to the change in the orientation of the concave mirror, before describing the optical arrangement according to the embodiment in detail. One reason for the change in the position of presentation of the virtual image is that the focal position (focal distance) of the concave mirror is changed in accordance with the angle of the image display light L diagonally incident on and reflected by the concave mirror.

Figure 2B:
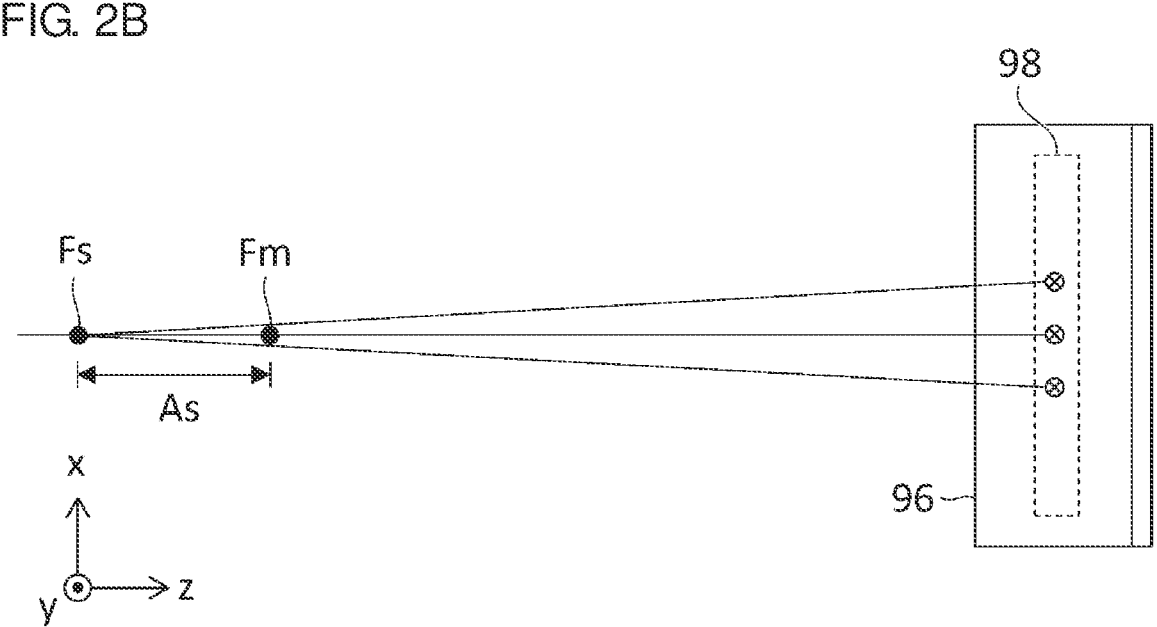

FIGS. 2A and 2B schematically show the focal position of parallel light beams incident on a concave mirror 96 and are views from different viewpoints. FIG. 2A shows light beams within the meridional plane (yz plane) of the concave mirror 96, and FIG. 2B shows light beams within the sagittal plane (xz plane) of the concave mirror 96. As illustrated, the points of convergence Fm and Fs of the parallel beams differ between the meridional plane and the sagittal plane. The focal point Fs within the sagittal plane is located farther from the concave mirror 96 than the focal point Fm within the meridional plane. This is because of the fact that, when parallel light beams are caused to be diagonally incident on a concave mirror, the distance to the position of convergence of light (i.e., the focal distance) changes in accordance with the incidence angle. A difference As between the focal point Fm within the meridional plane and the focal point Fs within the sagittal plane is called astigmatism. Denoting the focal distance of the concave mirror by f and the angle of incidence of light incident on the concave mirror by $\varphi$, the focal distance of diagonally incident light is given by f·cos $\varphi$. The larger the incidence and reflecting angle $\varphi$, the smaller the focal distance f·cos $\varphi$. In other words, the focal distance within the meridional plane on which the light beam is diagonally incident is reduced to f·cos $\varphi$. Meanwhile, the focal distance within the sagittal plane is extended to f/cos $\varphi$. Thus, in the case of causing the light beam to be diagonally incident on the concave mirror 96, the focal distance changes in accordance with the incidence and reflecting angle of the light beam on the concave mirror 96.

Figure 3:
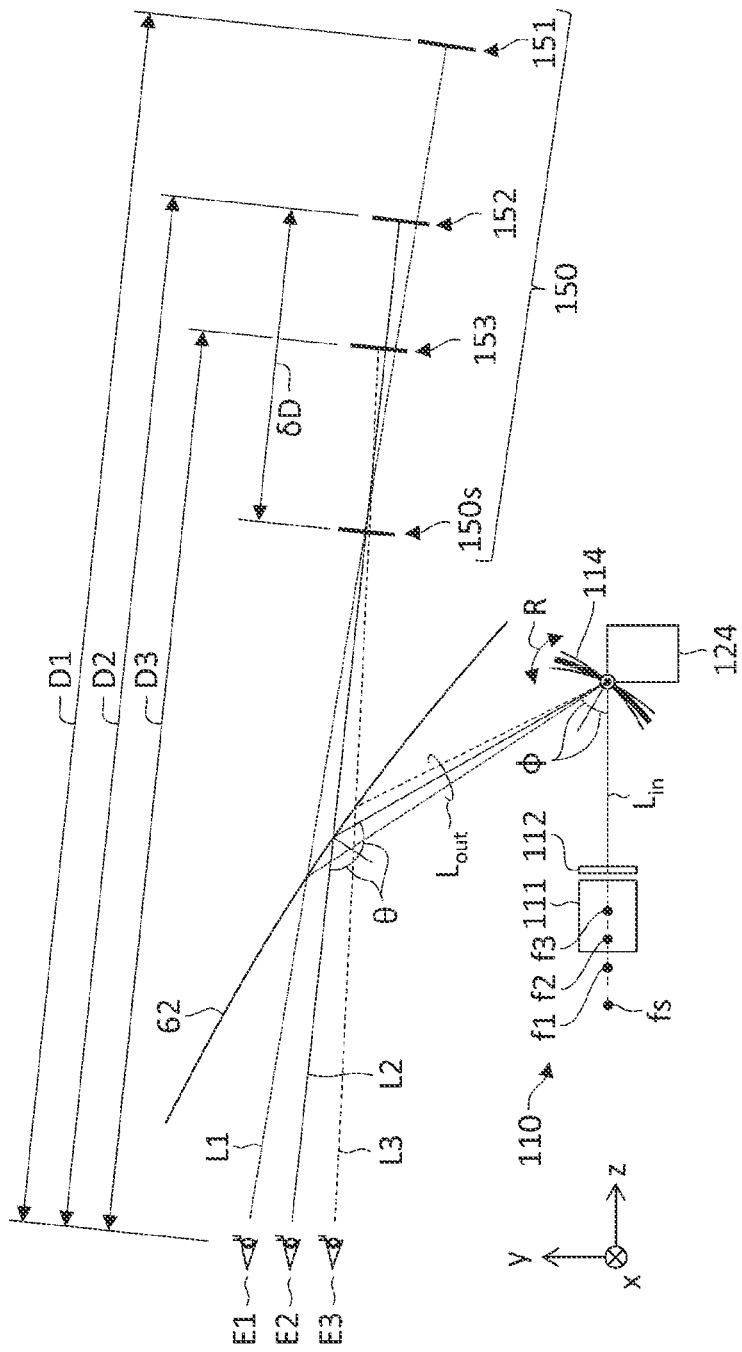
FIG. 3 schematically shows how the way the virtual image looks changes when the height of the eyes changes in the comparative example.

FIG. 3 schematically shows how the way the virtual image looks changes when the height of the eyes changes in the comparative example. A virtual image display device 110 according to the comparative example is configured in a manner similar to that of the embodiment except that the position of a display unit 112 is fixed relative to a concave mirror 114, and the distance from the concave mirror 114 to the display unit 112 remains unchanged. The virtual image display device 110 includes an illumination unit 111, a display unit 112, a concave mirror 114, and a driving mechanism 124. The image display light L generated by the display unit 112 is reflected by the concave mirror 114 toward the windshield 62 and is presented to the user as a virtual image.

Referring to FIG. 3, the direction of extension of the light path of the image display light $L_{in}$ traveling from the display unit 112 toward the concave mirror 114 is defined as the z direction. The concave mirror 114 reflects the image display light $L_{in}$ incident in the z direction in the upward direction (y direction) toward the windshield 62. The incidence and reflecting angle $\varphi$ of the image display light $L_{in}$, $L_{out}$ on the concave mirror 114 is about 10°-40°, and, more suitably, about 15°-35°. The driving mechanism 124 changes the incidence and reflecting angle $\varphi$ of the image display light L on the concave mirror 114 by rotating the concave mirror 114 as indicated by the arrow R. The amount of angular change $\Delta\varphi$ of the concave mirror 114 induced by the driving mechanism 124 is, for example, about ±5°. The pivot shaft of the concave mirror 114 is aligned with the x direction, which is a direction orthogonal to both the direction of travel of the image display light $L_{in}$ incident on the concave mirror 114 and the direction of travel of the image display light $L_{out}$ reflected and output by the concave mirror 114.

FIG. 3 shows the light paths of image display lights L1, L2, L3 occurring when virtual images 151, 152, 153 are presented to users E1, E2, E3 with different heights of the eyes. The driving mechanism 124 rotates the concave mirror 114 as indicated by the arrow R to adjust the orientation of the concave mirror 114. Rotating the concave mirror 114 to increase the incidence and reflecting angle $\varphi$ on the concave mirror 114 decreases the incidence and reflecting angle $\theta$ on the windshield 62. Conversely, decreasing the incidence and reflecting angle $\varphi$ on the concave mirror 114 increases the incidence and reflecting angle $\theta$ on the windshield 62. This allows the image display light to be projected in directions suitable for each of the users E1-E3 with different heights of the eyes.

When the orientation of the concave mirror 114 is changed in this process to suit each of the users E1-E3 with different heights, the focal position f1, f2, f3 changes in response to the change in the incidence and reflecting angle $\varphi$ on the concave mirror 114. Specifically, decreasing the incidence and reflecting angle $\varphi$ on the concave mirror 114 to suit the user E1 at a relatively high position makes the distance from the concave mirror 114 to the focal position f1 relatively longer. Meanwhile, increasing the incidence and reflecting angle $\varphi$ on the concave mirror 114 to suit the user E3 at a relatively low position makes the distance from the concave mirror 114 to the focal position f3 relatively shorter.

FIG. 3 schematically shows, as the focal positions f1-f3 of the concave mirror 114, meridional focal positions at which the light beam is converged within the meridional plane (yz plane). Also, the figure schematically shows the sagittal focal position at which the light beam is converged within the sagittal plane (xz plane), by using a symbol fs. The sagittal focal position fs of the concave mirror 114 remains substantially unchanged in response to the change in the incidence angle and reflecting angle $\varphi$ of the concave mirror 114, the change in the sagittal focal position fs being smaller than that of the meridional focal position f1-f3. The focal positions fs, f1-f3 of the concave mirror 114 are shown schematically and do not represent the accurate focal positions based on the optical arrangement in the virtual image display device 110.

When the focal position f1-f3 changes in response to the change in the orientation of the concave mirror 114, distances D1, D2, D3 to the positions of presentation of the virtual images 151-153 as viewed by the users E1-E3, respectively, change. The position of presentation of the virtual image can be generally calculated by using a so-called lens equation. Denoting the distance a from the concave mirror 114 to the display unit 112 by a, the distance from the concave mirror 114 to the virtual image by b, and the focal distance of the concave mirror by f, the relationship (1/b)=(1/a)−(1/f) holds. In the comparative example, the distance a from the concave mirror 114 to the display unit is fixed. When the focal distance f of the concave mirror 114 changes, therefore, the distance b to the position of presentation of the virtual image also changes. Specifically, when the incidence and reflecting angle $\varphi$ of the concave mirror 114 is decreased to suit the user E1 at a relatively high position, the distance from the concave mirror 114 to the focal position f1 becomes relatively longer, and the distance D1 to the position of presentation of the virtual image 151 becomes relatively longer. Meanwhile, when the incidence and reflecting angle φ of the concave mirror 114 is increased to suit the user E3 at a relatively low position, the distance from the concave mirror 114 to the focal position f3 becomes relatively shorter, and the distance D3 to the position of presentation of the virtual image 153 becomes relatively shorter.

The virtual images 151-153 for which the position of presentation changes in response to the change in the focal positions f1-f3 are meridional image planes on which the image appears to be focused in the vertical direction (within the meridional plane). Meanwhile, 150s denotes a sagittal plane presented more toward the user than the virtual images 151-153, on which plane the image appears to be focused in the horizontal direction (within the sagittal plane). Unlike the meridional image planes 151-153, the sagittal image plane 150s remains substantially unchanged if the orientation of the concave mirror 114 is changed. This is because the sagittal focal position fs of the concave mirror 114 hardly changes in response to the change in the angle of the concave mirror 114. This results in a phenomenon in which the amount of displacement δD between the position of presentation of the sagittal image plane 150s and the position of presentation of the meridional image plane 151-153 changes in accordance with the angle of the concave mirror 114. The amount of displacement δD between the sagittal image plane 150s and the meridional image plane 151-153 is called astigmatic difference.

It is preferred that the astigmatic difference δD between the sagittal image plane 150s and the meridional image plane 151-153 be of a predetermined value or smaller. It is preferred that the astigmatic difference measured in diopters be 0.25 D[m−1] or smaller. When the astigmatic difference δD exceeds 0.25 D, it is difficult for the human eyes to focus on both the sagittal image plane and the meridional image plane. This could result in a problem in that the virtual image looks blurred or that viewer feels dizzy or exhausted. In the comparative example, the position of presentation of the meridional image plane 151-153 changes in accordance with the orientation of the concave mirror 114. Therefore, the astigmatic difference δD might exceed a predetermined value (e.g., 0.25 D) depending on the position of the meridional image plane. This could result in a problem in that a suitable virtual image cannot be presented. Further, when the optical system is designed to accommodate the astigmatic difference δD within the predetermined value, another issue could arise. For example, it may become difficult to enlarge the virtual image to a suitable size, or the distance to the position of presentation of the virtual image is not suitable.

This is addressed by the embodiment by adjusting the position of the display unit 12 in accordance with the orientation of the concave mirror 14, thereby reducing the change in the position of presentation of the virtual image.

Figure 4:
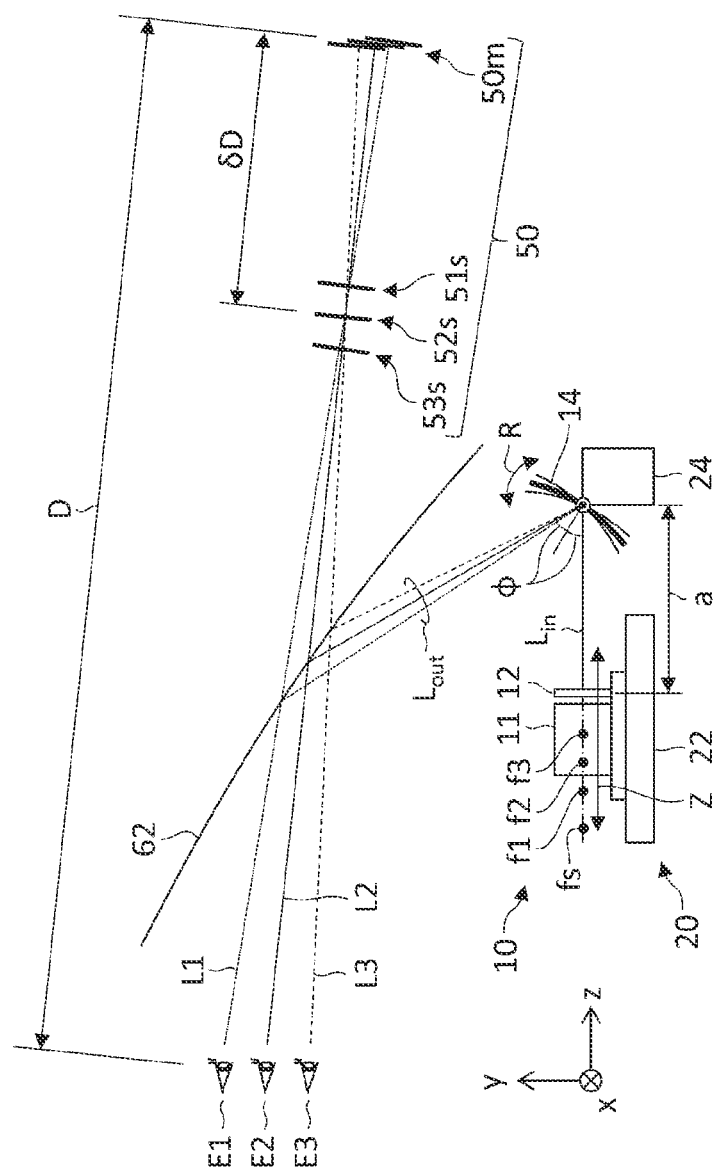
FIG. 4 schematically shows how the way the virtual image looks changes when the height of the eyes changes in the embodiment.

FIG. 4 schematically shows how the way the virtual image looks changes when the height of the eyes changes in the embodiment. In the embodiment, the display unit 12 is moved as indicated by the arrow z such that the distance a from the concave mirror 14 to the display unit 12 changes in accordance with the focal position f1-f3 of the concave mirror 14 resulting from the change in the incidence and reflecting angle φ of the concave mirror 14.

Specifically, the display unit 12 is moved in the −z direction to extend the distance a from the concave mirror 14 to the display unit 12, when the incidence and reflecting angle φ of the concave mirror 14 is decreased to suit the user E1 at a relatively high position. When the incidence and reflecting angle φ of the concave mirror 14 is increased to suit the user E3 at a relatively low position, on the other hand, the display unit 12 is moved in the +z direction to shorten the distance a from the concave mirror 14 to the display unit 12. For example, the distance D to the position of presentation of the meridional image plane 50m can be maintained unchanged by configuring the difference (1/a)−(1/f) between the reciprocal (1/a) of the distance a from the concave mirror 14 to the display unit 12 and the reciprocal (1/f) of the focal distance f of the concave mirror 14 to have a constant value. This resolves the problem explained in the variation described above that could arise when the position of presentation of the virtual image changes.

Figure 5:
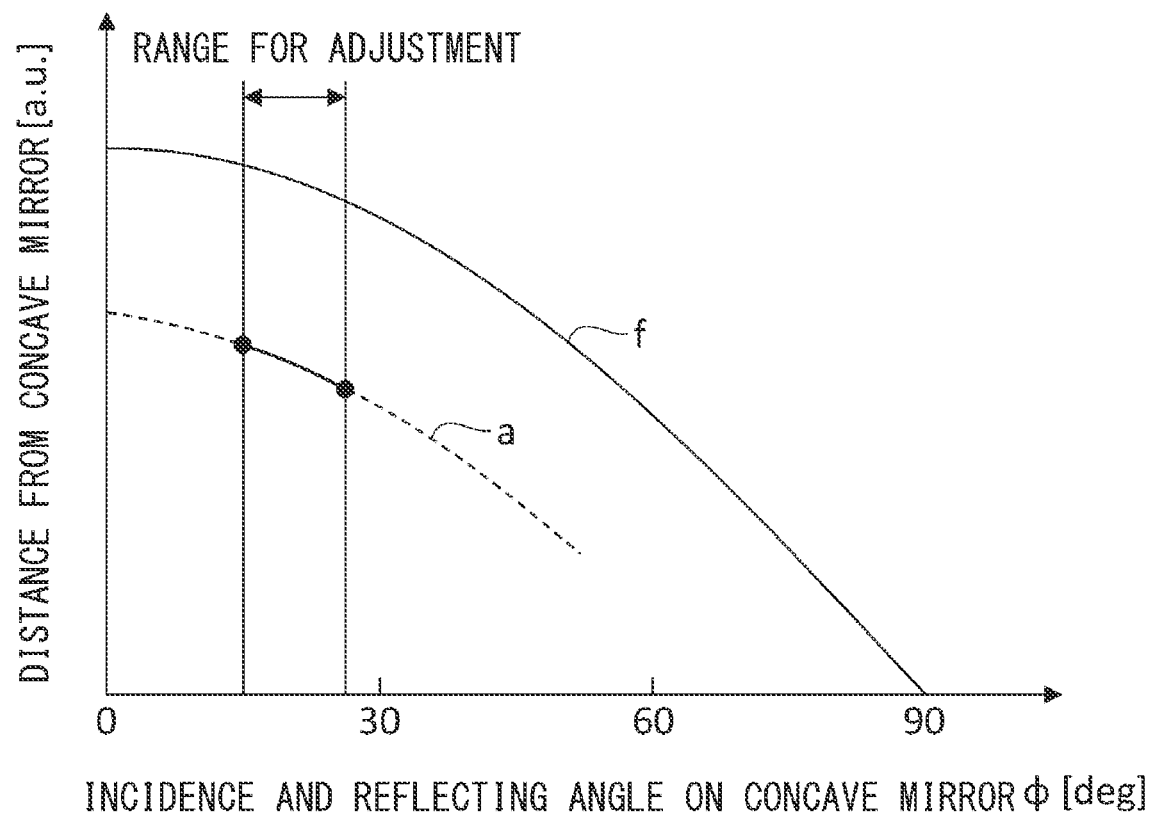
FIG. 5 is a graph schematically showing the change in the focal distance of the concave mirror and the change in the distance from the concave mirror to the display unit in response to the change in the angle of the concave mirror.

FIG. 5 is a graph schematically showing the change in the focal distance f of the concave mirror 14 and the change in the distance a from the concave mirror 14 to the display unit 12 in response to the change in the angle of the concave mirror 14. As shown in the graph, the larger the incidence and reflecting angle φ of the image display light L on the concave mirror 14, the smaller the focal distance f of the concave mirror 14. It is ensured that the position of presentation of the meridional image plane 50m remains unchanged by changing the distance a from the concave mirror 14 to the display unit 12 to adapt to the change in the focal distance f. In particular, it is ensured that the position of presentation of the virtual image remains unchanged by non-linearly changing the distance a from the concave mirror 14 to the display unit 12 in response to the change in the angle φ of the concave mirror 14. In one example, the distance a from the concave mirror 14 to the display unit 12 is changed in proportion to cos φ in response to the change in the angle φ of the concave mirror 14.

The distance a from the concave mirror 14 to the display unit 12 may be changed linearly in response to the change in the angle φ of the concave mirror 14. In this case, the position of presentation of the virtual image cannot be maintained unchanged, but the amount of change in the position of presentation of the virtual image is decreased as compared with the case of fixing the position of the display unit 12. FIG. 5 shows that the range of about 20°±5° is defined as a range for adjustment, and the amount of change in the distance a may not be linearly approximated with a high precision. In an alternative angular range (e.g., 35°±5°), however, the amount of change in the distance a may be linearly approximated with a high precision. In that case, the amount of change in the position of presentation of the virtual image can be suitably decreased by proportioning the change in the distance a to the change in the angle φ.

To maintain the position of presentation of the meridional image plane 50m unchanged more strictly in the configuration of FIG. 4, it is preferred to allow for the curvature, etc. of the windshield 62. This is because the position of presentation of the virtual image 50 is affected by the characteristic of all optical devices on the light path from the display unit 12 to the user E1-E3 and is determined by the focal distance of the composite optical system formed by the concave mirror 14 and the windshield 62. It is therefore preferred to determine the amount of change in the position of the display unit 12 to maintain the position of presentation of the virtual image unchanged in the composite optical system comprised of the combination of the concave mirror 14 and the windshield 62, instead of relying on the simple lens equation mentioned above.

In this embodiment, the distance a from the concave mirror 14 to the display unit 12 is changed in a situation in which the sagittal focal position fs remains substantially unchanged even if the orientation of the concave mirror 14 is changed. Therefore, the position of the sagittal image plane 51s, 52s, 53s could change as shown in FIG. 4. Specifically, decreasing the incidence and reflecting angle φ to suit the user E1 at a relatively high position to extend the distance a from the concave mirror 14 to the display unit 12 causes the sagittal image plane 51s to be presented relatively remotely. Increasing the incidence and reflecting angle φ to suit the user E3 at a relatively low position to shorten the distance a from the concave mirror 14 to the display unit 12 causes the sagittal image plane 53s to be presented relatively closely. As a result, the astigmatic difference δD could change in response to the change in the position of presentation of the sagittal image plane 51s-53s in this embodiment, too. In this embodiment, however, the sagittal focal distance fs is larger than the meridional focal distance f1-f3 so that change in the sagittal image plane 51s-53s caused by the change in the position of the display unit 12 is not so great. As a result, the amount of change in the astigmatic difference δD resulting from changing the angle φ of the concave mirror 14 can be decreased more successfully than in the comparative example. Further, by configuring the reflecting surface of the concave mirror 14 to have a toroidal shape, the change in the sagittal focal point associated with the change in the meridional focal point can be more minimized effectively. Therefore, it is possible to present a virtual image that can be easily viewed by the user E1-E3 over the range of change of the angle φ of the concave mirror 14.

According to this embodiment, the occurrence of double images caused by the thickness of the windshield 62 can be inhibited by presenting the sagittal image plane 51s-53s more toward the user than the meridional image plane 50m. Since the windshield 62 has a certain thickness, the image display lights L reflected by the two surfaces (the inner surface and the outer surface) of the windshield 62, respectively, could be viewed. In this process, a slight angular difference between the image display lights L reflected by the inner surface and the outer surface of the windshield 62, respectively, causes virtual images based on the respective image display lights to be superimposed on the scenery at a distance from each other. Double images as described herein are produced only on the meridional image plane and are not produced on the sagittal image plane. Therefore, arranging the sagittal image plane, on which double images are not produced, toward the user causes double images on the meridional image plane, which is arranged farther away from the user, to be less noticeable. It is therefore possible to present a virtual image that can be easily viewed the user E1-E3.

Figure 6:
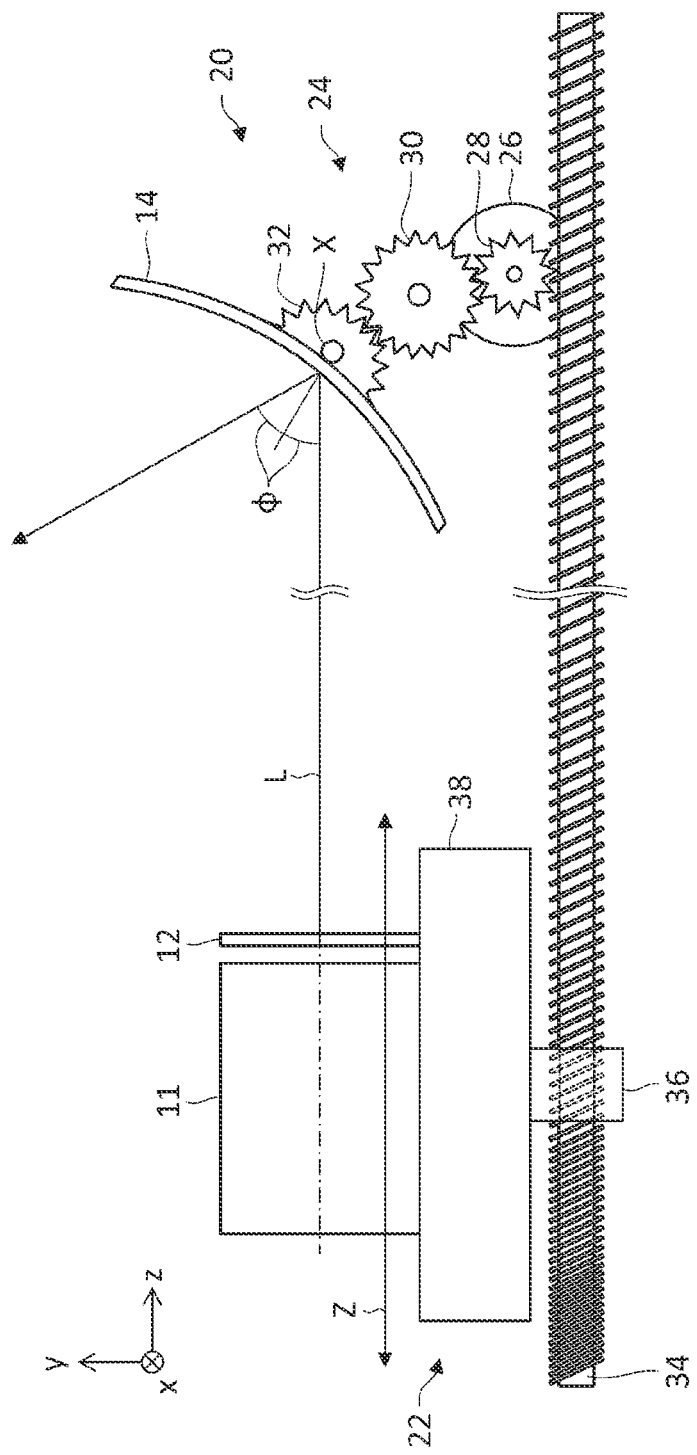
FIG. 6 is a side view showing the configuration of the driving mechanism according to the embodiment in detail.

FIG. 6 is a side view showing the configuration of the driving mechanism 20 according to the embodiment in detail. The driving mechanism 20 includes a drive motor 26, a drive gear 28, an intermediate gear 30, a pivot gear 32, a lead screw 34, a slider 36, and a stage 38. The first driving mechanism 22 is comprised of the lead screw 34, the slider 36, and the stage 38. The second driving mechanism 24 is comprised of the intermediate gear 30 and the pivot gear 32. The drive motor 26 and the drive gear 28 are used both in the first driving mechanism 22 and the second driving mechanism 24. A further gear, etc. (not shown) may be additionally provided between the drive gear 28 and the lead screw 34. The rotation of the drive gear 28 may be transformed into the rotation of the lead screw 34 by the additional gear, etc.

When the drive motor 26 is driven, the drive gear 28 is rotated, and the pivot gear 32 is rotated via the intermediate gear 30. The pivot gear 32 is attached to the back surface opposite to the reflecting surface of the concave mirror 14. The rotation of the pivot gear 32 changes the incidence and reflecting angle φ of the image display light L incident on the concave mirror 14. The direction of the pivot shaft X of the pivot gear 32 is the x direction.

The rotation of the drive gear 28 rotates the lead screw 34 extending in the z axis direction, causing the slider 36 to move in the Z direction in accordance with the amount of rotation of the lead screw 34. The stage 38 for supporting the illumination unit 11 and the display unit 12 is attached to the slider 36. The movement of the slider 36 moves the illumination unit 11 and the display unit 12 in the Z direction.

The driving mechanism 20 is configured such that, when the motor is driven to result in a relatively smaller incidence and reflecting angle φ of the concave mirror 14, the slider 36 moves in a direction away from the concave mirror 14 (−z direction). Stated otherwise, the driving mechanism 20 is configured such that, when the motor is driven to result in a relatively larger incidence and reflecting angle φ of the concave mirror 14, the slider 36 moves in a direction toward the concave mirror 14 (+z direction).

The lead screw 34 is configured such that the pitch of the screw is uneven at least in the range of movement of the slider 36. This can make the amount of movement of the slider 36 in the Z direction relative to the rotational angle of the drive motor 26 non-linear. Specifically, the lead screw 34 is configured such that the pitch is larger toward the drive motor 26 and smaller away from the drive motor 26. As a result, the amount of movement of the slider 36 relative to a given amount of rotation of the drive motor 26 is smaller when the incidence and reflecting angle φ of the concave mirror 14 is decreased to result in a relatively larger distance a from the display unit 12 to the concave mirror 14. On the other hand, the amount of movement of the slider 36 relative to a given amount of rotation of the drive motor 26 is larger when the incidence and reflecting angle φ of the concave mirror 14 is increased to result in a relatively smaller distance a from the display unit 12 to the concave mirror 14. This makes it possible to establish a non-linear relationship as shown in FIG. 5 between the angle φ and the distance a from the concave mirror 14 to the display unit 12. In this case, the slider 36 is joined to the lead screw 34 by means of a single pin. The embodiment makes it possible to adjust the position of the eye point in the vertical direction at which the virtual image 50 can be viewed, while at the same time reducing the change in the position of presentation of the virtual image 50, merely by driving the single drive motor 26.

Figure 7:
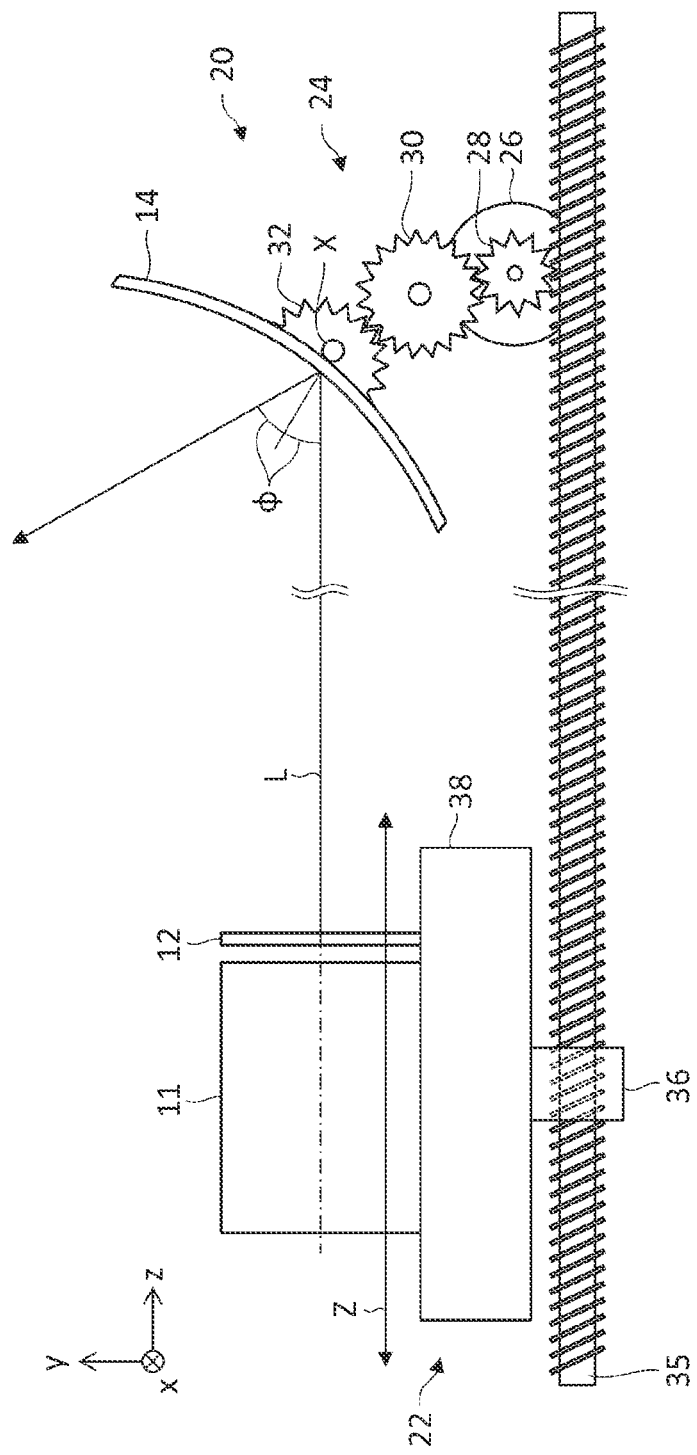
FIG. 7 is a side view showing the configuration of the driving mechanism according to a variation in detail.

FIG. 7 is a side view showing the configuration of the driving mechanism 20 according to a variation in detail. In the variation shown in FIG. 7, an alternative lead screw 35 having an even screw pitch is used in place of the lead screw 34 having an uneven screw pitch. Therefore, the distance a from the concave mirror 14 to the display unit 12 changes linearly in response to the change in the incidence and reflecting angle φ of the concave mirror 14. Therefore, the variation may not be able to eliminate the change in the position of presentation of the virtual image 50 in the depth direction when the position of the eye point at which the virtual image 50 can be viewed is adjusted. However, the variation can reduce the change in the position of presentation of the virtual image 50 in the depth direction. Accordingly, the variation can equally make it possible to adjust the position of the eye point in the vertical direction at which the virtual image 50 can be viewed, while at the same time reducing the change in the position of presentation of the virtual image 50, merely by driving the single drive motor 26.

In a further variation, the driving mechanism 20 may not be configured such that the first driving mechanism 22 and the second driving mechanism 24 use the single drive motor 26. For example, the first driving mechanism 22 and the second driving mechanism 24 may include individual drive motors. In this case, the control unit 40 may operate the drive motor of each of the first driving mechanism 22 and the second driving mechanism 24 to maintain the non-linear relationship shown in FIG. 5. For example, the angle φ of the concave mirror 14 and the position of the display unit 12 can be controlled with a high precision by using a stepping motor as the drive motor of each of the first driving mechanism 22 and the second driving mechanism 24. In this variation, the drive motor of each of the first driving mechanism 22 and the second driving mechanism 24 may be operated such that the position of the display unit 12 changes linearly in response to the change in the angle φ of the concave mirror 14.

In a still further variation, only the display unit 12 may be provided on the stage 38 so as to be movable in the z direction, and the illumination unit 11 may be fixed to the housing 18. The same advantage and benefit as achieved by the embodiment described above can be achieved when only the display unit 12 is moved.

The present invention has been described above with reference to the embodiment but is not limited to the embodiment. Appropriate combinations or replacements of the features of the illustrated examples are also encompassed by the present invention.

In the embodiment described above, the sagittal image plane 51s-53s is described as being arranged toward the user, and the meridional image plane 50m is described as being arranged away from the user, by utilizing the astigmatism of the concave mirror 14. In a variation, the virtual image display device 10 may be configured such that the meridional focal distance and the sagittal focal distance of the concave mirror 14 or the composite optical system coincide when the concave mirror 14 is oriented at a particular angle. For example, the meridional focal distance and the sagittal focal distance of the concave mirror 14 or the composite optical system may be configured to coincide at the angle of the concave mirror 14 occurring when the image display light L is presented to the user E2 at the intermediate height of FIG. 4. In this case, too, the change in the position of presentation of the virtual image in the depth direction as viewed from the user can be reduced by changing the distance a from the concave mirror 14 to the display unit 12 in response to the change in the focal distance caused by the change in the angle of the concave mirror 14.

In a variation, an optical device such as a convex lens may be added between the display unit 12 and the concave mirror 14. In this case, the change in the concave mirror 14 causes a change in the focal distance of the composite optical system formed by the windshield 62, the concave mirror 14, and the convex lens. Therefore, the position of the display unit 12 may be changed to mitigate the change in the position of presentation of the virtual image caused by the change in the focal distance of the composite optical system.

It should be understood that the invention is not limited to the above-described embodiment but may be modified into various forms on the basis of the spirit of the invention. Additionally, the modifications are included in the scope of the invention.

What is claimed is:

1. A virtual image display device for presenting a virtual image to a user via a virtual image presentation plate, comprising:
   a display unit that generates an image display light;
   a concave mirror that reflects the image display light and projects the image display light toward the virtual image presentation plate; and
   a driving mechanism that changes an orientation of the concave mirror to change an incidence angle of the image display light on the concave mirror and moves the display unit to change a distance from the concave mirror to the display unit in accordance with a change in a focal distance within a meridional plane of the concave mirror caused by a change in an incidence angle of the image display light on the concave mirror.

2. The virtual image display device according to claim 1, wherein
   the driving mechanism
   a) moves the display unit to extend the distance from the concave mirror to the display unit in accordance with an amount of increase in the focal distance within the meridional plane of the concave mirror responsive to an amount of decrease of the incidence angle, when the orientation of the concave mirror is changed to decrease the incidence angle of the image display light on the concave mirror, and
   b) moves the display unit to shorten the distance from the concave mirror to the display unit in accordance with an amount of decrease in the focal distance within the meridional plane of the concave mirror responsive to an amount of increase of the incidence angle, when the orientation of the concave mirror is changed to increase the incidence angle of the image display light on the concave mirror.

3. The virtual image display device according to claim 1, wherein
   the driving mechanism proportions an amount of change in the incidence angle of the image display light on the concave mirror to an amount of change in the distance from the concave mirror to the display unit.

4. The virtual image display device according to claim 1, wherein
   the driving mechanism establishes a predetermined non-linear correlation between the amount of change in the incidence angle of the image display light on the concave mirror and the amount of change in the distance from the concave mirror to the display unit.

5. The virtual image display device according to claim 1, wherein
   the driving mechanism configures an amount of change in a distance to a position of presentation of the virtual image as viewed from the user responsive to the change in the focal distance within the meridional plane of the concave mirror to be smaller than in a case of changing the orientation of the concave mirror while the distance from the concave mirror to the display unit is maintained fixed, by changing the distance from the concave mirror to the display unit in response to a change in the focal distance within the meridional plane of the concave mirror caused by the change in the incidence angle of the image display light on the concave mirror.

6. The virtual image display device according to claim 1, wherein
   the driving mechanism maintains a distance to a meridional image plane of the virtual image as viewed from the user constant, by changing the distance from the concave mirror to the display unit in response to the change in the focal distance within the meridional plane of the concave mirror caused by the change in the incidence angle of the image display light on the concave mirror.

7. The virtual image display device according to claim 1, wherein
the driving mechanism includes a lead screw that moves the display unit linearly in accordance with an amount of rotation of the concave mirror.

8. The virtual image display device according to claim 1, wherein
the driving mechanism maintains an astigmatic difference between a sagittal image plane and a meridional image plane as viewed from the user to be 0.25 $[m^{-1}]$ or smaller, by changing the distance from the concave mirror to the display unit in response to the change in the focal distance within the meridional plane of the concave mirror caused by the change in the incidence angle of the image display light on the concave mirror.

9. The virtual image display device according to claim 1, wherein
the driving mechanism coordinates a change in the orientation of the concave mirror and a change in a position of the display unit in accordance with a height of eyes of the user.

* * * * *